(12) United States Patent
Schwankhaus et al.

(10) Patent No.: US 10,183,470 B2
(45) Date of Patent: Jan. 22, 2019

(54) COMPOSITE GLASS

(71) Applicant: Saint-Gobain Glass France, Courbevoie (FR)

(72) Inventors: Norbert Schwankhaus, Baesweiler (DE); Ulrich Hermens, Aachen (DE); Udo Gelderie, Würselen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 186 days.

(21) Appl. No.: 14/655,378

(22) PCT Filed: Dec. 19, 2013

(86) PCT No.: PCT/CH2013/000228
§ 371 (c)(1),
(2) Date: Jun. 25, 2015

(87) PCT Pub. No.: WO2014/100905
PCT Pub. Date: Jul. 3, 2014

(65) Prior Publication Data
US 2015/0360446 A1 Dec. 17, 2015

(30) Foreign Application Priority Data
Dec. 27, 2012 (DE) .................... 20 2012 012 285 U

(51) Int. Cl.
*B32B 17/10* (2006.01)
*B29C 65/48* (2006.01)
(Continued)

(52) U.S. Cl.
CPC .... *B32B 17/10311* (2013.01); *B29C 65/4855* (2013.01); *B29C 65/54* (2013.01);
(Continued)

(58) Field of Classification Search
CPC ................. E06B 3/66; B32B 17/10311; B32B 17/10045; B32B 17/10761; B29L 2031/778
See application file for complete search history.

(56) References Cited

U.S. PATENT DOCUMENTS 5,061,748 A   10/1991   Bolton et al.
6,159,606 A * 12/2000   Gelderie ........... B32B 17/10311
                                                    428/426

FOREIGN PATENT DOCUMENTS

DE         197 31 416         9/1998
DE     20 2010 008 729        1/2011
(Continued)

OTHER PUBLICATIONS

Machine translation of already applicant cited reference DE 202010008729.*
(Continued)

*Primary Examiner* — Donald J Loney
(74) *Attorney, Agent, or Firm* — Rankin, Hill & Clark LLP

(57) ABSTRACT

A flame-retardant composite glass including a plurality of glass panes and a flame-retardant intermediate layer that is arranged between two first glass panes and includes a flame-retardant material that foams or swells up in the event of a fire, as well as an attack-resistant layer having a transparent plastic that is solid at room temperature. The flame-retardant composite glass has, between the first glass panes, an edge compound extending along and around the edges such that a chamber filled with said flame-retardant material is defined by the first glass panes and the edge compound. Between at least one of the first glass panes and the flame-retardant material, a primer layer is arranged that includes a material whose adhesion to the flame-retardant
(Continued)

intermediate layer and/or to the glass pane becomes weaker in flame-retardant test conditions than it is in room temperature conditions.

15 Claims, 2 Drawing Sheets

(51) Int. Cl.
    *B29C 65/54*    (2006.01)
    *E06B 3/66*     (2006.01)
    *B29K 75/00*    (2006.01)
    *B29K 105/00*   (2006.01)
    *B29L 31/00*    (2006.01)

(52) U.S. Cl.
    CPC .. *B32B 17/10045* (2013.01); *B32B 17/10761* (2013.01); *E06B 3/66* (2013.01); *B29K 2075/00* (2013.01); *B29K 2105/256* (2013.01); *B29K 2995/0016* (2013.01); *B29L 2031/778* (2013.01); *B32B 2333/12* (2013.01); *B32B 2369/00* (2013.01); *Y10T 428/24777* (2015.01)

(56) References Cited

FOREIGN PATENT DOCUMENTS

| | | |
|---|---|---|
| DE | 10 2009 044 796 | 6/2011 |
| EP | 0 494 548 | 7/1992 |
| EP | 0 620 781 | 5/1999 |
| JP | 2003-012350 | 1/2003 |
| WO | 99/04970 | 2/1999 |
| WO | 2009/111897 | 9/2009 |
| WO | 20101091525 | 8/2010 |

OTHER PUBLICATIONS

Machine translation of already applicant cited refernece DE 102009044796.*
Machine translation of already applicant cited reference JP 2003012350.*

* cited by examiner

COMPOSITE GLASS

BACKGROUND OF THE INVENTION

Field of the Invention

The invention relates to a fire-resistant glass, in particular to fire-resistant composite glass.

Description of Related Art

Different fire-resistant composite glass, with attack-resistant layers are known from the state of the art, for example from WO 2010/091525 or from DE 20 2010 008 729U. Such attack-resistant composite glass usually includes a plurality of glass plates as well as between two of the glass plates, an intermediate layer which foams in the case of fire and additionally a film of a plastic, which in the case of high mechanical loads—for example due to impacts or projectiles—give the composite the necessary strength and/or impact strength.

The composite glass according to WO 2010/091525 and according to DE 20 2010 008 729U must be manufactured with an autoclaving method that requires a significant amount of effort. Moreover, the manufacture of the intermediate layer ("the fire-resistant layer") which foams in the case of fire, is also time consuming with the composite glass according to DE 20 2010 008 729U.

SUMMARY OF THE INVENTION

It is the object of the invention to provide a composite glass that overcomes the disadvantages of the state of the art and which, in particular, combines good fire-resistant characteristics and good attack-resistant characteristics with a rational manufacturability.

The attack-resistant layer is manufactured of a suitable, transparent plastic which is known for this purpose and which is firm, which is to say solid, at room temperature, in particular of polycarbonate or possibly PMMA. Constructions with a polycarbonate layer between two glass panes are known in the state of the art for example as bulletproof "glass-clad polycarbonate GCP" constructions; wherein the safety regarding projectiles is demanded by some standards. As is known, per se, a layer, for example an adhesive film based on polyurethane or of another suitable material and that provides the bonding or adhesion can be present between the attack-resistant layer and a glass pane, which is connected to this as the case may be, and transparent curing adhesives which are to be applied in the liquid or viscous condition can also be used.

The fire-resistant intermediate layer can be a foaming/swelling fire-resistant layer, for example according to EP 0 620 781 or WO 2009/111 897 or a layer that is created by way of drying an alkali silicate mass. However, it can also be a hydrogel fire-resistant layer. Generally, the intermediate layer is solid and/or liquid, wherein systems of solid and liquid phases (e.g. disperse systems, amongst these gels) and systems with a solid-liquid transition that is not clearly defined are also considered.

The fire-resistant intermediate layer in particular can be designed such that gas arises or the gas substance quantity is increased, in the intermediate space between the carrier elements, given the effect of heat under fire safety test conditions (for example, with temperatures acting upon the composite glass with a thermal loading as a function of time according to ISO 834-1), due to a physical phase conversion (evaporation of water or another solvent, for example in small bubbles with foaming materials, liquefaction of a solid substance) and/or due to a chemical reaction, for example a thermal decomposition (pyrolysis).

The attack-resistant layer can be arranged between two glass planes, or form an outer surface of the fire-resistant composite glass or a surface to another element—for example to a gas-filled intermediate space, with a design as insulation glass, or to a PVB layer etc.

The term "primer" is to be understood in that the primer layer creates an adhesion between the glass pane and the fire-resistant intermediate layer and this adhesion at normal temperatures—for example of maximal 50° C.—prevents a detachment of the glass and the fire-resistant intermediate layer from one another, even over long periods of time.

The primer layer is preferably in particular present on that glass plane, which lies on the side facing the fire (inasmuch as this side is defined). The primer layer is particularly preferably present in each case on both sides of the fire-resistant intermediate layer.

The idea of the primer layer being designed such that the adhesion reduces at conditions that prevail with a fire safety test is based on the finding that in the case of a strong heating prevailing at test conditions and also in the serious case, the glass pane facing the fire can rupture and individual pieces can detach. If this is the case, it is to be ensured that the cohesion within the fire-resistant layer is greater than the adhesion to the glass pane facing the heat source, so that no gaps are torn into the fire-resistant layer, when pieces detach from the glass pane.

The primer layer can be designed, for example, such that its adhesion onto the fire-resistant intermediate layer significantly reduces at temperatures close to the boiling point of water, i.e. at temperatures of above approx. 80° or above approx. 90°.

Hydrophobic substances and/or or substances with a softening point for example of between 80° and 150°, in particular between 90° and 120° are worth being considered as materials for the primer layer.

With fire-resistant intermediate layers based on alkali silicate, a silane for example, in particular an organo-functional silane, in particular an alkyl silane or a fluorinated and/or chlorinated alkyl silane can be used as a primer. The primer layer can alternatively be a material from the group of waxes, fatty acids, fatty acid derivatives, thermoplastic lacquers/paints, in each case preferably with a softening point or melting point between 70° C. or 80° C. and 150° C.

Primer systems which are suitable for the present application are described, for example, in WO 99/04970.

The edge composite can be of two parts and include a spacer (and/or adhesive) as well as a sealing mass. The spacer, for example, can be present at the inner side and the sealing mass at the outer side. Plastics such as, for example, butyl polymers—in particular polyisobutylene are worth being considered as spacers, and hybrid constructions of a metallic frame and a plastic are also considered. Polysulphide is suitable as a sealing mass, for example, and other plastics such as silicones and polyurethane with sealing characteristics are likewise known.

Likewise the subject-matter of the invention is a method for manufacturing a fire-resistant composite glass of the described type.

BRIEF DESCRIPTION OF THE DRAWINGS

Embodiment examples of the invention are hereinafter described in more detail by way of figures. The figures are schematic and are not true to scale. The same reference numerals in the figures describe the same or analogous elements. There are shown in.

DETAILED DESCRIPTION OF THE INVENTION

Figure 1:
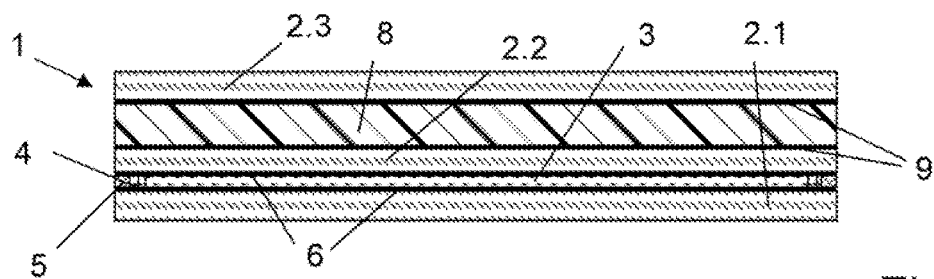
FIG. 1-5 in each case, a fire-resistant composite glass in cross section.

The fire-resistant composite glass according to FIG. 1 comprises two first glass panes 2.1, 2.2 and between these an intermediate layer 3, which foams in the case of fire, wherein these together form a fire-resistant glass composite. A peripheral edge composite is present along the edges and includes a spacer 4 of a butyl polymer as well as an edge seal or sealing 5 of a material that effectively seals the fire-resistant protective layer 3 to the surrounding air. Polysulphide, for example, is considered as a material for the edge seal.

In each case, a primer layer of a polyethylene (PE) wax (in particular a paraffin wax or a wax with $C_nH_{2n+2}$ chains with n between 20 and approx. 100) is arranged between the two first glass panes 2.1, 2.2 and the fire-resistant intermediate layer.

The fire-resistant composite glass moreover includes a further intermediate layer 8 of polycarbonate, which serves for attack-resistance. A further glass pane 2.3 terminates the composite glass to the side, which lies at the top in FIG. 1.

An adhesive layer 9 is yet present between the polycarbonate intermediate layer 8 (polycarbonate plate) and the glass panes 2.2, 2.3 adjacent these. A layer in the form of a film or a layer that is deposited in the still flowable condition, and of a thermoplastic or curing plastic, for example based on polyurethane, can serve as an adhesive layer, and any transparent adhesive is considered, in particular adhesives which require no curing temperatures of above 80° C. and whose adhesion effect is present at room temperature (as the case may be after a curing process).

The glass panes 2.1, 2.2, 2.3 can consist of thermally and/or chemically prestressed glass or of other glasses such as float glass, for example, ceramic glass etc. Combinations are possible, for example, by way of only the outer glass panes of the composite glass consisting of prestressed glass.

Figure 2:
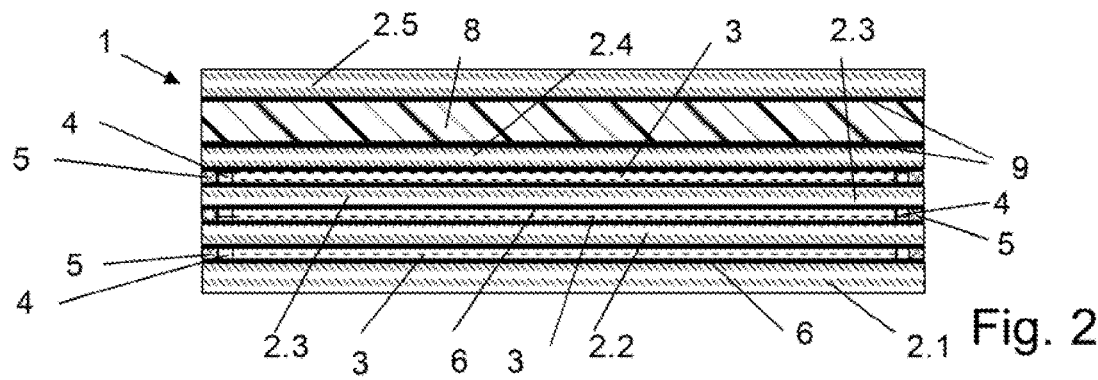

As is known per se, the fire-resistant glass composite can also include more than two glass panes with a fire-resistant intermediate layer arranged there between. FIG. 2 illustrates a construction that differs from that of FIG. 1 in that three fire-resistant intermediate layers 3 are present, with a corresponding number of glass panes 2.1-2.5 and edge composites 4, 5.

The teaching of the invention applies to constructions with an infinite number of fire-resistant layers. It also applies to constructions, in which yet further elements than merely the intermediately lying glass pane are yet present between the fire-resistant layers, for example the or at least one of the further intermediate layer(s), an insulation layer or another element.

A primer layer 6 is present at each boundary surface between a fire-resistant intermediate layer and a glass pane, in FIG. 1 as well as in FIG. 2 as well as in the subsequently described embodiment examples. This is not a necessity. In contrast—with a plurality of fire-resistant layers—a primer layer 6 can also be present only at some fire-resistant layers, and/or a primer layer can also be present only at one side of the fire-resistant layer—in particular at the boundary layer to that glass pane, at whose side a break-out of fire is to be expected.

Figure 3:
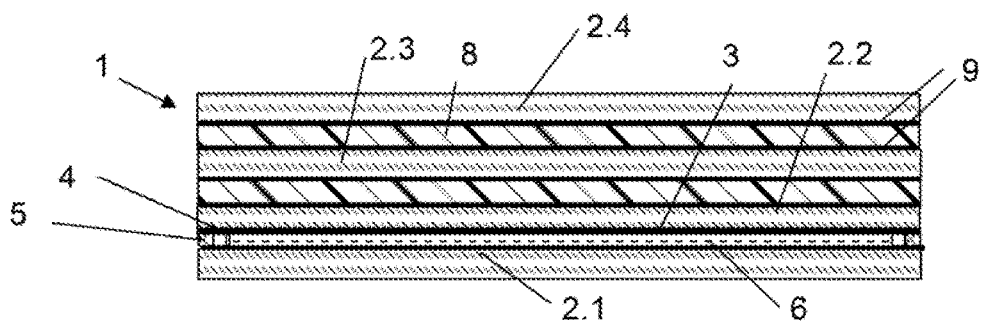

FIG. 3 shows a variant with two intermediate layers 8 of polycarbonate or another suitable material, but also one of the intermediate layers 8 can be constructed of polycarbonate and the other of acrylic glass; and other material combinations are possible.

Figure 4:
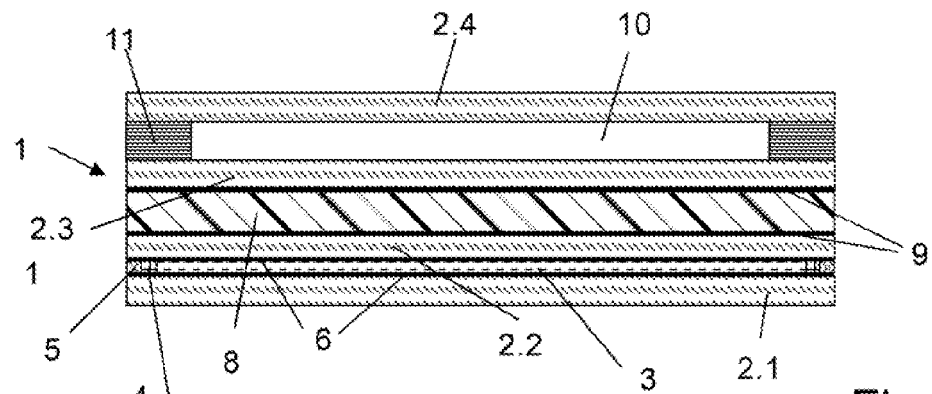

FIG. 4 shows a design of the fire-resistant composite class as an insulation glass. The composite glass between two of the glass planes 2.3, 2.4 includes an empty space 10 that is filled, for example, with an inert gas or another dry gas. An insulation glass edge composite 11 of the type know for insulation glass hermetically seals the empty space 10.

Figure 5:
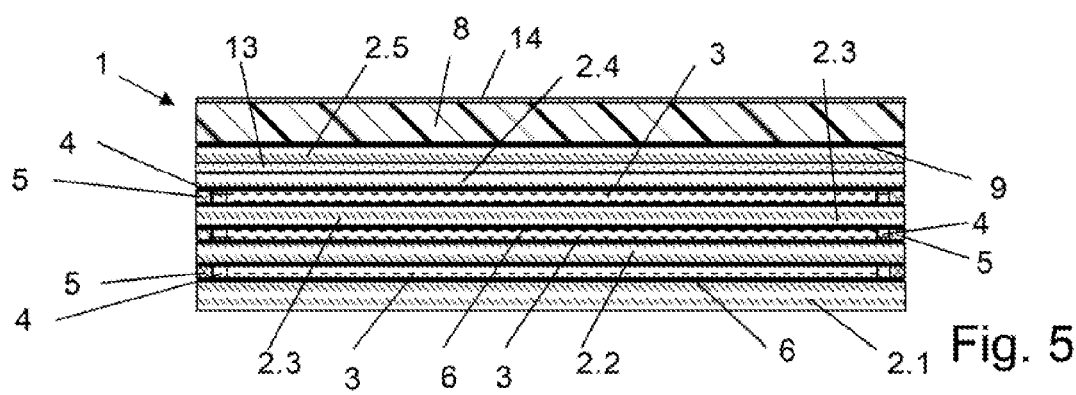
Figure 6:
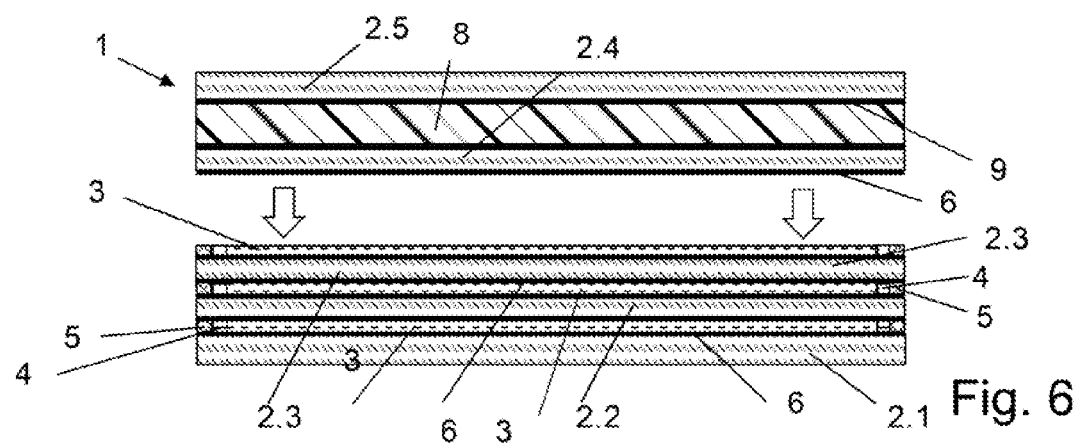
FIG. 6 the manufacture of a fire-resistant composite glass, with the example of the embodiment of FIG. 2.

The fire-resistant composite glass according to FIG. 5 has the following differences to that of FIG. 2 and these can be implemented independently of one another.

The intermediate layer (attack-resistant layer) 8 of polycarbonate or PMMA is arranged on the composite at the outer side. Depending on the situation of use, a possible scratch-proof coating 14 is present for this and terminates the composite to the side of the attack-resistant layer.

A polyvinyl butyral (PVB) film is arranged between two glass panes 2.4, 2.5 of the fire-resistant composite glass. This, as is known per se, has a high tear resistance and in the case of fire or attack binds the glass shards and with this helps to prevent a total failure.

The features of the described embodiments described here can be combined without further ado:

All embodiments can be designed with one or more fire-resistant intermediate layers 3.

The different embodiments can be designed with one or more attack-resistant intermediate layers.

The different embodiments can be designed as insulation glass.

The attack-resistant layer(s) can in each case be arranged between two glass panes, or one of the attack-resistant layers can be arranged lying at the outside, with or without scratch-proof coating.

The fire-resistant composite glass can include a PVB film or foil of another material with comparable characteristics.

A first construction as a glass/polycarbonate/glass composite (for example, by autoclaving) is manufactured, for example, for creating a fire-resistant composite glass with a fire-resistant intermediate layer and an attack-resistant layer, in particular of the described type. The spacer is deposited onto a pane of this composite and a counter-pane is subsequently applied thereon (it is also possible to attach the spacer on the counter-pane instead of on the first construction), whereupon one seals to the outside with the edge sealing. The fire-resistant mass is then filled through a filling opening into the chamber which is defined by way of this, and subsequently cured. This, for example, is effected in an oven, for example at normal pressure and for example at approx 90° C. As the case may be, further fire-resistant intermediate layers with an edge composite and glass panes can be applied before the curing (and before or after the filling). A second construction, which already includes several glass panes with an edge composite and an already filled or not yet filled chamber, can also be applied onto the first construction instead of an individual counter-pane, wherein in this case too, the spacer is either present on the first construction or on the second construction.

The step of depositing the edge sealing in the variants of the manufacturing method can also be effected before bringing together the first construction with the counter-pane, which is to say the second construction.

The fire-resistant layer does not have to be heated to temperatures, at which then could foam or bloom, due to the fact that in this method, the first construction is created with the attack-resistant layer and at least one glass pane, before it comes into contact with the fire-resistant intermediate layer. An autoclaving method as a result is also not necessary, by way of which such a foaming/blooming is prevented.

The invention claimed is:

1. A fire-resistant composite glass, with a plurality of glass panes and with a fire-resistant intermediate layer that is arranged between two first ones of the glass panes and that comprises a fire-resistant mass foaming or swelling in the case of fire, as well as an attack-resistant layer of transparent plastic that is solid at room temperature and arranged parallel to a flat side of one of the plurality of glass panes,
wherein the fire-resistant composite glass comprises an edge composite, said edge composite being arranged between the first glass panes and extending peripherally along edges of the first glass panes, in a manner such that a chamber is defined by the first glass planes and the edge composite,
wherein said chamber is filled by the fire-resistant mass, and
wherein a primer layer is formed of a material whose adhesion to the fire-resistant intermediate layer and/or to the glass pane is reduced at temperatures above 80° C. as compared to adhesion of the primer layer to the fire-resistant intermediate layer and/or to the glass pane under room temperature conditions, said primer layer being arranged between at least one of the first glass panes and the fire-resistant mass.

2. The fire-resistant composite glass according to claim 1, wherein the attack-resistant layer is constructed of polycarbonate or polymethyl methacrylate.

3. The fire-resistant composite glass according to claim 1, wherein the primer layer is hydrophobic.

4. The fire-resistant composite glass according to claim 1, wherein the primer layer has a softening temperature between 70° C. and 150° C.

5. The fire-resistant composite glass according to claim 1, wherein the edge composite comprises a spacer and a sealing mass.

6. The fire-resistant composite glass according to claim 5, wherein the sealing mass is arranged peripherally with respect to the spacer.

7. The fire-resistant composite glass according to claim 5, wherein the spacer comprises a butyl polymer as an essential constituent.

8. The fire-resistant composite glass according to claim 5, wherein the sealing mass comprises a polysulphide.

9. The fire-resistant composite glass according to one of the preceding claims, further comprising a polyvinylbutyl layer arranged parallel to the flat side.

10. The fire-resistant composite glass according to claim 1, wherein an insulation glass edge composite is present between two of the glass panes, said insulation glass edge composite with the two glass panes defining a gas-filled interior, by which means the fire-resistant composite glass is a fire-resistant insulation glass.

11. The fire-resistant composite glass according to claim 1, wherein the fire-resistant composite glass comprises a plurality of fire-resistant intermediate layers separated from one another by way of at least one glass pane,
wherein the plurality of fire-resistant intermediate layers are arranged parallel to the flat side.

12. The fire-resistant composite glass according to claim 1, wherein the fire-resistant composite glass comprises a plurality of attack-resistant layers separated from one another by at least one other sheet-like element,
wherein the plurality of attack-resistant layers are arranged parallel to the flat side.

13. The fire-resistant composite glass according to claim 1, wherein the attack-resistant layer is arranged between one of the first glass panes and a further glass pane.

14. The fire-resistant composite glass according to claim 1, wherein at least one of the glass panes is formed from prestressed glass.

15. A method for manufacturing a fire-resistant composite glass with a plurality of glass panes and with a fire-resistant intermediate layer that is arranged between two first ones of the glass panes and which is with a fire-resistant mass which foams or swells in the case of fire, as well as with an attack-resistant layer of transparent plastic that is solid at room temperature and arranged parallel to a flat side of one of the plurality of glass panes, wherein the method comprises the following steps:
manufacturing a construction as a composite of a glass pane with an attack-resistant layer and a further glass pane,
attaching an edge composite that is peripheral along the edge, and a further glass pane, onto a flat side of the construction,
filling a cavity between the construction, the further glass pane and the edge composite with a fire-resistant mass and
curing the fire-resistant mass,
wherein at least one of the glass panes before the filling of the cavity is provided with a primer layer of a material whose adhesion to the fire-resistant intermediate layer and/or to the glass pane reduces at temperatures above 80° C. in comparison to room temperature conditions.

* * * * *